United States Patent Office 2,989,441
Patented June 20, 1961

2,989,441
THERAPEUTIC AND PROPHYLACTIC AGENT FOR UPPER RESPIRATORY INFECTIONS
Byron E. Leach, 905 Sena Drive, Metairie, La.
No Drawing. Filed Dec. 15, 1959, Ser. No. 859,563
4 Claims. (Cl. 195—80)

This invention relates to a new therapeutic and prophylactic agent for the treatment of upper respiratory infections, and is more particularly concerned with a method for obtaining this product from a fermentation product containing the same.

It is known that various antibiotics can be obtained from a *Streptomyces griseus* fermented medium, for example, one which comprises glucose, meat extract, peptone and sodium chloride. Specifically, such antibiotics have been designated "Streptomycin" and "Cycloheximide," and their structural formulae are well known in the art.

I have now found that another therapeutic agent can be derived from a *Streptomyces griseus* fermented medium such as noted above. This therapeutic agent has no antibiotic activity against the usual in vitro tests. However, it has a marked effect when used both as a prophylactic and for therapeutic purposes in connection with upper respiratory illnesses.

This therapeutic agent has been shown to have a boiling point of between about 62 to 64° C. at a pressure of 150 microns. It exhibits the following maximum and minimum ultraviolet ray readings when dissolved in absolute ethyl alcohol, and in concentrated sulfuric acid, respectively:

In ethyl alcohol—maximum is at 245 mu and $k=17.0$; no ascertainable minimum.

In concentrated sulfuric acid—maximum is at 298 mu, $k=23.0$; minimum is at 251 mu.

My therapeutic agent is distinctly different from streptomycin and cycloheximide and customary procedures for the isolation of these compounds cannot be utilized completely. It is, therefore, an object of the present invention to provide a method whereby a therapeutic agent of the type contemplated by my invention may be obtained in high yields from by-products of usual cycloheximide extraction processes.

A further object of the invention is the provision of a process whereby my therapeutic agent may be distilled from the residue ordinarily discarded in a cycloheximide extraction process.

Other objects of the invention will become appparent hereinafter.

According to the usual procedure employed for the isolation of cyclohexamide, the filtrate obtained after an *S. griseus* fermented medium is eluted, dissolved in aqueous solution, extracted with a water-miscible organic solvent and crystallized out, is discarded as being of negligible value. No consideration has been given to the possibility that this filtrate might have any value whatsoever. It has now been found that this usually discarded filtrate may be subjected to distillation as to provide an excellent source for my upper respiratory illness treatment agent.

The process of this invention consists essentially in the treatment of an acidic liquid *S. griseus* fermentation product with an activated carbon, and elution of the active material therefrom. This is readily accomplished in commercial operation by employing the filter cake obtained from the treatment of an *S. griseus* fermentation beer with decolorizing carbon and a diatomaceous earth filter aid, and then filtering the mixture. The filter cake is treated with an alcohol or ketone which is substantially completely water-miscible, to eluate cycloheximide therefrom. The volatile solvent is removed from the eluate in vacuo and the aqueous residue is extracted with a water-miscible organic solvent, preferably a chlorinated hydrocarbon solvent, e.g., chloroform, or an ester, e.g., amyl acetate or butyl acetate. The amyl acetate or other extract is decolorized with a decolorizing carbon and the amyl acetate concentrated, whereupon the cycloheximide crystallizes. In some instances the cyclohexamide may crystallize immediately, but it is actually advantageously further purified before crystallization from the solvent.

The cyclohexamide which has been crystallized, as noted heretofore, is then separated from the solvent by filtration or centrifugation. The mother liquor, which was formerly discarded as of negligible value, is subject to a distillation process. The distillate obtained at a temperature ranging from 80 to 150° C. at between 200–600 microns pressure, is recovered. This distillate may be used as such but is normally subjected to repurification by means of a fractionating distillation column in accordance with well known and conventional technique.

As noted heretofore, the therapeutic agent obtained by the foregoing method has a boiling point ranging from 62–64° C. at a pressure of 150 microns. The following example is illustrative of my invention and is not to be construed as limiting the same.

*Example 1*

Eight hundred and twenty liters of acidic beer from a streptomycin fermentation was clarified with 2050 grams (0.25%) of decolorizing carbon (Nuchar C-190Nu) and 8200 grams (1%) of diatomaceous earth filter aid (Celite). This treatment completely removed cycloheximide from the solution and the filtrate was subjected to further treatment for the separation of streptomycin. Portionwise elution of the carbon-filter-aid-mycelium cake with acetone gave 30.0 grams of the cycloheximide. The eluate was then concentrated in vacuo to an aqueous residue having a volume of 38.0 liters and a pH of 2.8. The aqueous residue was extracted with three four-liter portions of amyl acetate. Crystallization was then conducted and the cycloheximide removed by filtration.

The filtrate was distilled in vacuo and the distillate collected over a temperature range of from 80–150° C. at a pressure between 200–600 microns and over a time period of approximately 4 hours. The distillate collected measured approximately 10 milliliters. It was subjected to a repurification step using a conventional fractionating distillation column at a temperature of from 62 to 64° C. and a pressure of 150 microns. The distillate which resulted was approximately 2 milliliters in amount and constitutes the final product.

My product is normally utilized by application thereof to an absorbent material such as cotton. The so treated absorbent material can then be suspended in a room and the product inhaled upon vaporization.

Extensive control tests were conducted and significant results obtained. For example, 159 persons were used as a control group. Over a period of observation, 47 thereof had acute attacks of influenza with temperatures ranging up to 105° F. During a subsequent and similar period of observation in which these patients were exposed to my therapeutic agent suspended on cotton balls, it was observed that there were only 7 cases of upper respiratory illness and only one such case was severe enough to necessitate hospitalization.

Variations may be made without departing from the spirit or scope of the invention and it is to be understood that I limit myself only as defined in the following claims.

I claim:

1. A process for the production of a therapeutic and prophylactic agent for upper respiratory illnesses which comprises providing an acidic *Streptomyces griseus* fermentation beer, treating the beer with activated adsorptive carbon, eluting the adsorbed material therefrom with at least one solvent of the group consisting of water-miscible alcohols and ketones, removing the eluting liquid, extracting cycloheximide from the resulting residue with a compound selected from the group consisting of chlorinated hydrocarbons and esters thereby crystallizing said cycloheximide, removing the crystallized cycloheximide, distilling the resulting mother liquor and obtaining a distillate at a temperature of between 80 and 150° C. and at a pressure of 200–600 microns, and redistilling to obtain a distillate at a temperature of between 62 and 64° C. at a pressure of about 150 microns.

2. A process as claimed in claim 1 wherein the cycloheximide is extracted with amyl acetate.

3. A process as claimed in claim 1 wherein the cycloheximide is extracted with chloroform.

4. A therapeutic and prophylactic agent for the treatment of upper respiratory illnesses comprising a compound obtained by the process of claim 1.

References Cited in the file of this patent

UNITED STATES PATENTS 2,612,502     Leach _____ Sept. 30, 1952